US00RE47108E

(19) United States
(12) Reissued Patent
Jacobus et al.

(10) Patent Number: US RE47,108 E
(45) Date of Reissued Patent: Oct. 30, 2018

(54) AUTOMATED WAREHOUSING USING ROBOTIC FORKLIFTS

(71) Applicant: Cybernet Systems Corp., Ann Arbor, MI (US)

(72) Inventors: Charles J. Jacobus, Ann Arbor, MI (US); Glenn J. Beach, Grass Lake, MI (US); Steve Rowe, Grass Lake, MI (US)

(73) Assignee: Cybernet Systems Corp., Ann Arbor, MI (US)

(21) Appl. No.: 15/439,301

(22) Filed: Feb. 22, 2017

Related U.S. Patent Documents

Reissue of:
(64) Patent No.: 8,965,561
Issued: Feb. 24, 2015
Appl. No.: 13/836,305
Filed: Mar. 15, 2013

(51) Int. Cl.

| | |
|---|---|
| ***G06F 7/00*** | (2006.01) |
| ***G06Q 10/08*** | (2012.01) |
| ***B66F 9/06*** | (2006.01) |
| ***G05D 1/02*** | (2006.01) |

(Continued)

(52) U.S. Cl.
CPC ..... *G06Q 10/087* (2013.01); *B66F 9/063* (2013.01); *B66F 9/0755* (2013.01); *B66F 9/24* (2013.01); *G05D 1/0246* (2013.01); *G05D 1/0274* (2013.01); *G05D 1/024* (2013.01); *G05D 1/0278* (2013.01); *G05D 2201/0216* (2013.01)

(58) Field of Classification Search
CPC ..... G06Q 10/087
USPC ..... 700/216, 214, 217, 228, 229
See application file for complete search history.

(56) References Cited

U.S. PATENT DOCUMENTS 7,321,305 B2 * 1/2008 Gollu ..... G01C 21/005 340/10.1
7,826,919 B2 * 11/2010 D'Andrea ..... B66F 9/063 700/214

(Continued)

OTHER PUBLICATIONS

Correa, A. et al., "Multimodal Interaction with an Autonomous Forklift", Human-Robot Interaction (HRI), 2010 5th ACM/IEEE International Conference on. IEEE, 2010.*

(Continued)

*Primary Examiner* — William Doerrler
(74) *Attorney, Agent, or Firm* — John G. Posa; Belzer PC

(57) ABSTRACT

A system for automated inventory management and material handling removes the requirement to operate fully automatically or all-manual using conventional vertical storage and retrieval (S&R) machines. Inventory requests to place palletized material into storage at a specified lot location or retrieve palletized material from a specified lot are resolved into missions for autonomous fork trucks, equivalent mobile platforms, or manual fork truck drivers (and their equipment) that are autonomously or manually executed to effect the request. Automated trucks plan their own movements to execute the mission over the warehouse aisles or roadways sharing this space with manually driven trucks. Automated units drive to planned speed limits, manage their loads (stability control), stop, go, and merge at intersections according human driving rules, use on-board sensors to identify static and dynamic obstacles, and human traffic, and either avoid them or stop until potential collision risk is removed.

18 Claims, 9 Drawing Sheets

(51) Int. Cl.
*B66F 9/24* (2006.01)
*B66F 9/075* (2006.01)

(56) References Cited

U.S. PATENT DOCUMENTS 8,565,913 B2 * 10/2013 Emanuel ..... B66F 9/0755 340/572.1
8,594,834 B1 * 11/2013 Clark ..... G06Q 10/087 700/214
2005/0102203 A1 * 5/2005 Keong ..... G06Q 10/087 705/28
2006/0287760 A1 * 12/2006 Charych ..... B66F 9/0755 700/214
2010/0266381 A1 * 10/2010 Chilson et al. ..... 414/809
2014/0058634 A1 * 2/2014 Wong et al. ..... B66F 9/063 701/50

OTHER PUBLICATIONS

King-Hele, D., "Erasmus Darwin's Improved Design for Steering Carriages and Cars," *Notes and Records of the Royal Society of London*, vol. 56, No. 1, Jan. 2002, pp. 41-62; Originally patented in England in 1818.
Lozowy, D., "Inventor of the Tractor," Citation http://ricolor.org/history/eng/prm/blinov. Patented in US in 1913 by B. Holt, Patent 1076578. Citation only, http://en.wikipedia.org/wiki/Benjamin_Holt.
Dickmanns, E.D. et al., "Guiding Land Vehicles Along Roadways by Computer Vision," *Congres Automatique* (1985: Toulouse, France). *The tools for tomorrow*. 1985; Overview of Dickmann's early work in automated driving.
Lowrie, J.W. et al. "The Autonomous Land Vehicle (ALV) Preliminary Road-following Demonstration," *Proc. SPIE*, vol. 579, 1985. Overview of the entire ALV includes elements from JADI disclosure. Martin-Marietta (prime contractor) view.
Kanade, T. et al., "Autonomous Land Vehicle Project at CMU," *Proceedings of the 1986 ACM Fourteenth Annual Conference on Computer Science*. ACM, 1986. Overview of the entire ALV includes elements from JADI disclosure. CMU view. Includes Lader stuff.
Shafer, S. et al., "An Architecture for Sensor Fusion in a Mobile Robot," *Robotics and Automation, Proceedings, 1986 IEEE International Conference on*. vol. 3. IEEE, 1986.
Nasr, H. et al., "Guiding an Autonomous Land Vehicle Using Knowledge-based Landmark Recognition," *Proceedings of the DARPA Image Understanding Workshop*, 1987.
Turk, M. et al., "Video Road-following for the Autonomous Land Vehicle," *Robotics and Automation. Proceedings, 1987 IEEE International Conference on*. vol. 4. IEEE, 1987. Overview of automated driving for ALV.
Waxman, A. et al., "A Visual Navigation System for Autonomous Land Vehicles," *Robotics and Automation, IEEE Journal of* 3.2(1987): 124-141. Overview of automated driving for ALV.
Asada, M., "Building a 3D World Model for Mobile Robot from Sensory Data," *Robotics and Automation, 1988. Proceedings., 1988 IEEE International Conference on*. IEEE, 1988.
Daily, M. et al., "Autonomous Cross-country Navigation with the ALV," Robotics and Automation, 1988. Proceedings., 1988 IEEE International Conference on. IEEE, 1988. Includes LADAR signal processing algorithms.
Dickmanns, E. et al., "Autonomous High Speed Road Vehicle Guidance by Computer Vision," International Federation of Automatic Control. World Congress (10th). Automatic control: World Congress, vol. 1, 1988. Overview of Dickmann's early work in automated driving.
Dunlay, R., "Obstacle Avoidance Perception Processing for the Autonomous Land Vehicle," Robotics and Automation, 1988. Proceedings., 1988 IEEE International Conference on. IEEE, 1988.
Turk, M. et al., "VITS—A Vision System for Autonomous Land Vehicle Navigation." Pattern Analysis and Machine Intelligence, IEEE Transactions on 10.3 (1988): 342-361.
Everett, H.R. et al., "Survey of Collision Avoidance and Ranging Sensors for Mobile Robots. Revision 1," No. NCCOSC/RDT/E-1194-REV-1. Naval Command Control and Ocean Surveillance Center RDT an E Div San Diego CA, 1992.
Chun, W. et al., "Unmanned Ground Vehicle Demo II: Demonstration A," Photonics for Industrial Applications, International Society for Optics and Photonics, 1995.
Carmer, D. et al., "Laser Radar in Robotics," Proceedings of the IEEE 84.2 (1996): 299-320.
Garibotto, G. et al., "Computer Vision Control of an Intelligent Forklift Truck," Intelligent Transportation System, 1997. ITSC'97., IEEE Conference on. IEEE, 1997.
Larsen, T. et al., "Location Estimation for an Autonomously Guided Vehicle Using an Augmented Kalman Filter to Autocalibrate the Odometry," FUSION98 Spie Conference, 1998.
Garibotto, G. et al., "Industrial Exploitation of Computer Vision in Logistic Automation: Autonomous Control of an Intelligent Forklift Truck," *Robotics and Automation, 1998. Proceedings. 1998 IEEE International Conference on*. vol. 2. IEEE, 1998.
Kelly, A. et al., "Rough Terrain Autonomous Mobility—part 2: An Active Vision, Predictive Control Approach," Autonomous Robots 5.2 (1998): 163-198.
Matsumara, J. et al., "Lightning Over Water: Sharpening America's Light Forces for Rapid Reaction Missions," D: Robotics: Augmenting the Soldier?, Rand Corporation Report, MR-1196-A/OSD, 0-8330-2845-6, 2000.
Pagès, J. et al., "A Computer Vision System for Autonomous Forklift Vehicles in Industrial Environments," In Proc. of the 9th Mediterranean Conference on Control and Automation MEDS, vol. 2001, 2001.
Pagès, J. et al., "An Accurate Pallet Pose Estimation for Guiding Autonomous Forklift Vehicles," Proc. of WESIC 2001, Univ. of Twente, The Netherlands, Jun. 27-29, 2001.
Seelinger, M. et al., "Automatic Visual Guidance of a Forklift Engaging a Pallet," Robotics and Autonomous Systems 54.12 (2006): 1026-1038.
Shoemaker, C., "Development of Autonomous Robotic Ground Vehicles: DoD's Ground Robotics Research Programs: Demo I through Demo III," Intelligent Vehicle Systems: A 4D/RCS Approach (2006): 283, Nova Publishers.
Armesto, L. et al., "Automation of Industrial Vehicles: A Vision-based Line Tracking Application," Emerging Technologies & Factory Automation, 2009. ETFA 2009. IEEE Conference on. IEEE, 2009.
Bouguerra, A. et al., "An Autonomous Robotic System for Load Transportation," Emerging Technologies & Factory Automation, 2009. ETFA 2009. IEEE Conference on. IEEE, 2009.
Moore, D. et al., "Simultaneous Local and Global State Estimation for Robotic Navigation," Robotics and Automation, 2009. ICRA'09. IEEE International Conference on. IEEE, 2009.
Tamba, T. et al., "A Path Following Control of an Unmanned Autonomous Forklift," International Journal of Control, Automation and Systems 7.1 (2009): 113-122.
Furmans, K. et al., "Plug-and-Work Material Handling Systems," *2010 International Material Handling Research Colloquium*, Milwaukee, USA. 2010
Cui, G. et al., "A Robust Autonomous Mobile Forklift Pallet Recognition," *Informatics in Control, Automation and Robotics (CAR), 2010 2nd International Asia Conference on*. vol. 3. IEEE, 2010.
Walter, M. et al., "Closed-loop Pallet Engagement in an Unstructured Environment," Proceedings of the IEEE International Conference on Robotics and Automation (ICRA) Workshop on Mobile Manipulation, Anchorage, Alaska. May 2010.
Karaman, S. et al., "Anytime Motion Planning Using the RRT*," *Robotics and Automation (ICRA), 2011 IEEE International Conference on*. IEEE, 2011.
Kollar, T. et al., "Towards Understanding Hierarchical Natural Language Commands for Robotic Navigation and Manipulation," MIT-CSAIL-TR-2011-007. Feb. 1, 2011.

(56) References Cited

OTHER PUBLICATIONS

Song, Y. et al., "Implementation of Distributed Architecture Based on CAN Networks for Unmanned Forklift," *IECON 2011—37th Annual Conference on IEEE Industrial Electronics Society*. IEEE, 2011.
Widytriatmo, A. et al., "Navigation Function-based Control of Multiple Wheeled Vehicles," *Industrial Electronics, IEEE Transactions on* 58.5 (2011): 1896-1906.
Widyotriatmo, A. et al., "Control Architecture of Material Handling Vehicles," *Instrumentation Control and Automation* (*ICA*), *2011 2nd International Conference on*. IEEE, 2011.
"ARToolKit is a Software Library for Building Augmented Reality (AR) applications," Human Interface Technology Laboratory (HIT Lab) at the University of Washington, http://www.hitl.washington.edu/artoolkit/ Dec. 25, 2012.
Long, P., "Determining Position and Orientation of Pallet Used for Controlling Autonomous Forklift in Warehouse Automation," Journal of Computer Science and Cybernetics 26.3 (2012): 267-277.
Gage, D.W. "UGV History 101: A Brief History of Unmanned Ground Vehicle (UGV) Development Efforts," Special Issue on Unmanned Ground Vehicles, Unmanned Systems Magazine, vol. 13, No. 3, Summer 1995.
Lecking, D. et al., "The RTS-STILL Robotic Fork-Lift," EURON Technology Transfer Award (2005).

* cited by examiner

AUTOMATED WAREHOUSING USING ROBOTIC FORKLIFTS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

This invention relates in general to material handling systems, and more particularly, to a method and system for transporting inventory items within an inventory system.

BACKGROUND OF THE INVENTION

Modern inventory systems, such as those in warehouses, superstores, mail-order, and e-commerce warehouses and larger manufacturing facilities, use gantry storage—and retrieval (S&R) systems that require dedicated space and large capital investment or vertical pallet stacking on shelving served by manually driven fork trucks. The former provides fast, accurate responses to requests for inventory items but is a large integrated capital investment. On the other hand, manual forklift vertical storage systems can cause delays and backlogs in the process of responding to inventory requests, and furthermore require drivers and loaders and their salaries, benefits, and management burden.

Historically, inventory systems are based around high vertical storage using pallet stacks or pallet stacks on shelving units. This arrangement offers a compromise between easy access and 3 dimensional storage to reduce floor space. This type of storage is accessed by forklifts of various configurations. The typical way this type of 3 dimensional storage is automated is through gantry style S&R units that provide three dimensional access to the pallet storage locations along a fixed set of travels (row selection, perhaps through an automated conveyor; column selection with a pallet transport device moving along a preplaced rail, and vertical pallet retrieval or storage along an elevator lift mechanism).

The type of automation just described is expensive, requires rework of the entire storage/retrieval space, and is an all or nothing proposition—one cannot practically partially automate a space—it either is automated or remains manually retrieved with forklifts. Furmans, et al. ("Plug-and-Work material handling systems." 2010 International Material Handling Research Colloquium, Milwaukee, USA. 2010) provides an overview of the current state of the art, and suggests modularizing S&R functionality as a means to improve it. As an illustrative example, the SmartRack and the KARIS Flexconveyor provide a computer controlled roller conveyor segment mounted on an autonomous material handling robot platform.

Solutions to the existing lack of flexibility in this field are addressed in various U.S. Patents assigned to Kiva Systems. In the Kiva system, the normal storage shelves with pallets stored at fixed positions is replaced by what Kiva refers to as inventory holders. These items are basically risers upon which pallets or other items (for instance shelves or work stations for package integration operators) can be placed so that they are up off of a flat transport surface normal the warehouse floor. The inventory holders are loaded at an incoming area, usually manually or via some kind of lift assist (forklift).

What Kiva refers to as a mobile unit—a small four wheeled mobile robot—moves under the inventory holder. Using a lift elevator attachment, the mobile unit lifts the inventory off of the support surface, and moves to the destination storage location. In many uses of the system, this could be any empty location over the warehouse floor that can be remembered and recalled by an inventory location database. At the destination location, the mobile unit lowers the inventory holder and is then schedule to execute its next pick-up and place operation. Retrieve works the same ways but in reverse. A mobile unit goes to the pick-up location in the storage array, lifts up the selected inventory holder, brings it back to a work cell or packing area, and places it down to await the next pick and place operation.

The advantages of Kiva's system is that storage area can be allocated as a dynamic buffer, and S&R performance can be optimized both by storage layout and by the number of mobile units acting in the system. By using standardized holders, the mobile units only need to implement a single and very simple lift elevator. By dividing the storage space into grids, and labeling at least some of the grids with location barcodes on the floor (Kiva calls them fiducials), centralized control of very simple mobile robots becomes feasible by block reservation and relocalization each time a unit passes over a barcode. Robot unit sensing devolves to being able to count distance and 90 degree turns and periodically detecting and locating a ground placed fiducial labeled so that the system can easily identify its location relative to that fiducial within the warehouse location grids. Path planning and collision avoidance is handled through the central controller by reserving the next grid any particular mobile unit plans to traverse, or waiting for that grid's currently occupying unit to move out of the grid (i.e. the requesting unit waiting for the grid reservation request to be satisfied or completed before moving into it).

The Kiva approach has several disadvantages. First, like a 3D gantry S&R unit, it is an all or nothing proposition—one cannot easily mix manual operated lift units with either of these automated concepts in a shared common area. Manual transport devices or people are not equipped with the sensors or controllers to reserve grids so are invisible to the central transport scheduling system. Kiva mobile units might be seen by people or manually controlled transports, but mobile units are not equipped with the sensing required for them to see the manually controlled assets. Therefore safety and collision avoidance cannot be assured in mixed operation. This means that in operations that uses conventional lift trucks or mix inventory storage with shopping (for instance the super stores like Home Depot or Sam's Club where product is stored in vertical shelving, placed there by lift trucks, but selected by people that walk around the aisles) cannot easily mix with the Kiva S&R system. Also Kiva is basically a 2 dimensional system that requires large ground footprints. In urban areas where land is more expensive, this might be too costly and low density.

SUMMARY OF THE INVENTION

This invention improves upon existing warehousing and inventory systems by facilitating operation in high density, 3 dimensional storage spaces like a gantry or lift truck system, while supporting gradual or incremental implementation of full automation. As such, the invention mixes and interoperates with manual lifts and individuals performing pick and place (or shopping), thereby enabling productivity increments that gantry and Kiva-type systems bring to fully manually operated S&R (storage and retrieval). The new technology promises to be lower in cost per unit volume moved compared to either manual or automated S&R.

The invention is based on the fact that robotic technology can operate a mobile lift unit. However, this idea is extended by providing an automation kit for conventional lift trucks and mobile transport units. This automation kit is endowed with the same capabilities as a human driver which knows the warehouse layout (and operational areas between or outside of warehouses) through an internal digital map. This includes where storage shelves are, how they are addressed, and where travel lanes or roads are (including intersections and traffic control conventions).

The automated lift can sense pallets or load positions, can read pallet identifications (barcodes, RFID, printing), can identify moving and fixed obstacles, and can plan from-to paths through using data in the warehouse map. Based on sensing behavior, the automation kit can obey human-like driving rules (for instance, maintain spacing with the moving object in front, stop at intersections, use the right-first rule when multiple vehicles arrive at the intersection at the same time, drive around stopped obstacles safely, stop for pedestrians who cross the travel area intersecting the lift's travel route, etc.).

With automated lifts and transporters as our basic building block, we can integrate the S&R system as a scheduling system that can work like and potentially directly integrated into a pre-existing manual warehousing system. The S&R controller converts incoming inventory requests (pick-up or placement requests) into (a) selection of a free automated or manual lift; (b) transmission of the pick-up and delivery location (based on a location in the map database) to either a human driver (via voice, display or traveler slip directive) or an automated lift (via the to-from mission plan); and (d) execution by the manual or automated lift of the pick-from place-to mission plan followed by return to its staging area (or immediate acceptance of the next inventory request mission).

Because both manual and automated mobility systems operate according to the same behavior and safety rules and operate through comparable sensing systems, both robotic and manual lifts can interoperate over the same shared space. This allows the warehouse operator gradual migration to fully automated operation, reducing both initial capital and operating costs and managing capital investment rate. The concept supports especially well stocking and restocking of superstores, where pallets are available to shoppers during normal store houses, but can be restocked either through manual or automated lifts during off-hours.

DETAILED DESCRIPTION OF THE INVENTION

Figure 1:
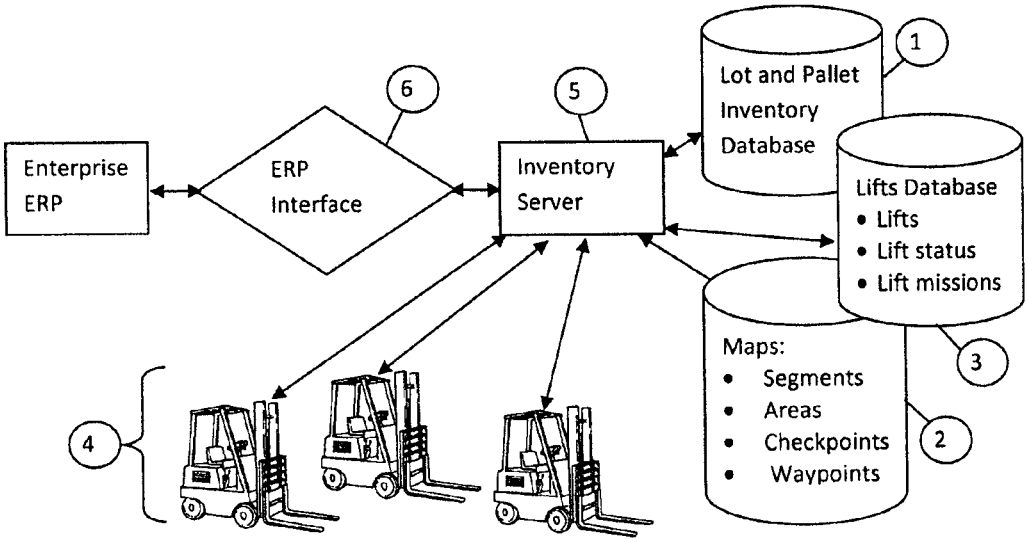
FIG. 1 shows a message flow between system controller modules.

This invention resides in an automated material handling, transporting and inventory management system that removes the requirement to operate fully manually using conventional vertical storage and retrieval (S&R) machines (i.e. forklifts) or fully automatically (S&R gantry type system or managed floor space systems with inventory holders and mobile drive units). The approach assumes concurrent use of conventional lifts and similar transport platforms, some equipped with automation to operate safely along with manually drive lifts into and out of the warehouse.

The invention is based on automated inventory control requests similar to those that drive gantry S&R systems, the Kiva Systems inventory holder, and mobile unit S&R systems. But higher efficiency and responsiveness is achieved by combining conventional lifts and pallet shelving units, emerging automated drive technology applied to at least some of these lifts, and an automated S&R database and controller system.

Because we implement through the existing and mature vehicle and storage space approaches that support gradual installation of the automation and interoperability between manned and unmanned vehicle units, our approach is not an all-or-nothing proposition. Furthermore, by utilizing a true 3-dimensional vertical space storage architecture, our systems provide superior space efficiency. Also because lift trucks typically have larger capacity that do small mobile robot units, fewer trucks can do than same work as many more smaller robotic units over the same work period.

In accordance with the invention, inventory requests (requests to place palletized material into storage at a specified lot location or requests to retrieve palletized material from a specified lot) are resolved into missions for autonomous fork trucks, equivalent mobile platforms, or manual fork truck drivers (and their equipment) that are autonomously or manually executed to effect the request. Automated trucks plan their own movements to execute the mission over the warehouse aisles or roadways sharing this space with manually driven trucks. Automated units drive to planned speed limits, manage their loads (stability control), stop, go, and merge at intersections according human driving rules, use on-board sensors to identify static and dynamic obstacles and people and either avoid them or stop until potential collision risk is removed.

These automated trucks have the ability to execute task specific behaviors as they progress along the mission, including visiting palletizing/depalletizing, refueling, or other locations in the order defined by the mission, driving into or through tight openings using sensor-based driving guidance algorithms, and performing pallet finding and engagement and disengagement onto pallet stacks and into shelving units. Automated trucks also can identify pallet locations and pallet identification codes by standard commercial means including but not limited to RFID, barcode, UID, optical characters on printed labels through computer vision/camera, and RF code readers. Each automated truck can be placed into manual drive mode at anytime, and along with unmodified manual fork trucks can be driven over the shared space concurrently used by automated trucks.

FIG. 1 illustrates message flow between system controller modules. A system controller for a warehouse or multiple warehouses comprises the following digital modules or components:

Database of inventory stored (1)—This is a database that stores information including but not limited to the following items:

1. Lot identifier—Lots are collections of material of the same type stored in one or more locations consisting of one or more pallets;
2. Pallet identifier—Identifiers that combine with the lots number to uniquely identify each pallet;
3. Lot locations—Location of a lot in warehouse or site map coordinates (Warehouse number and X, Y, Z relative to the warehouse point of origin);
4. X, Y, Z coordinates (measurement from the warehouse or site origin in meters, feet, or any other convenient measure); and
5. Pallet locations—the relative X, Y, Z to a pallet from the beginning of the lot location.

Figure 2:
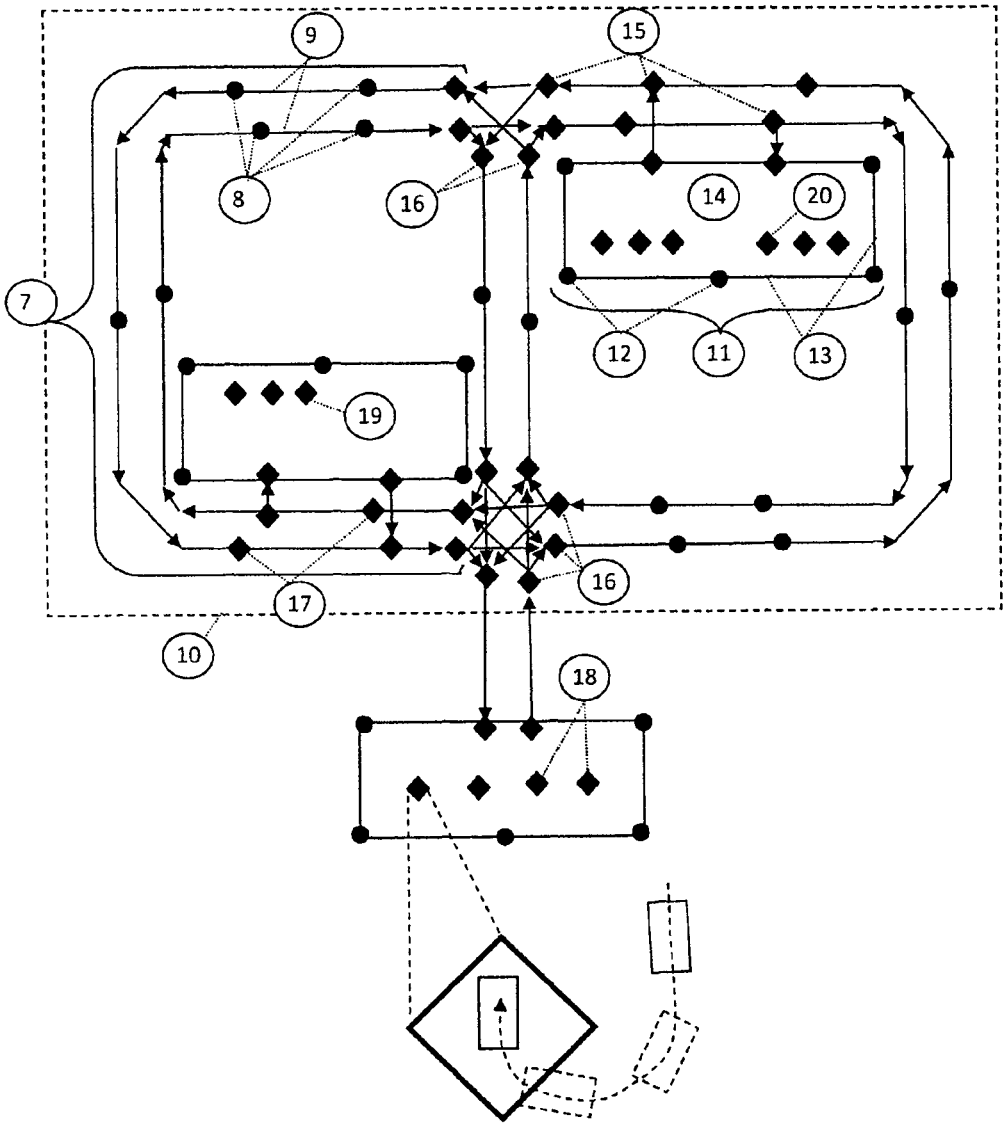
FIG. 2 shows a warehouse or site map components.

Map Database of the warehouse(s) or site (2). Reference is made to FIG. 2, which shows a warehouse and site map components, defined as follows:

1. Path segments.
   a. List (7) of X, Y way points (8) in sequence that can be smoothly connected with curves or lines (9) to represent a path a vehicle is allowed to drive—For inside warehouse (10) applications these will normally be in the same coordinate space as lot and pallet locations. For outside of warehouses on connecting parking lots or roadways these may be latitude or longitude. Any convenient set of coordinates covering the space can be used with appropriate coordinate conversions applied.
   b. Way points may also include specification of a truck orientation. If so this orientation must be achieved as part of achieving the way point location.
2. Area sections.
   a. List of (11) X, Y way points (12) in a sequence that can be smoothly connected with curves or lines (13) to enclose an area (14) within which a vehicle is allowed to freely drive—As with paths segments these can be defined inside or outside of a warehouse.
3. Checkpoints (15)
   a. Any way point in a Path segment or point defined on the boundary or within an Area section with additional behavior invoking properties when a vehicle is at or near it. Examples:
      i. End waypoints of a Path segment may be designated as checkpoints having intersection properties such as 4-way stop, 2-way stop, merge from lower priority segment into higher priority segment while yielding to cross traffic, etc. (16) shows an example intersection and its checkpoints.
      ii. Speed limit—from this checkpoint until further notified, reduce speed to the specified limit (17)
      iii. Pause—Stop at the checkpoint and wait for some event, example: manual loading or unloading operation (18)
      iv. Destination—Where a load is to be delivered (typically also Pallet location)—(19)
      v. Pick-up—Where a load is to picked-up (also typically also a Pallet location)—(20)
   b. Checkpoints may also include specification of a truck orientation. If so this orientation must be achieved as part of achieving the Checkpoint location.

Databases of automated/manual lifts (or other transport vehicle)—(3)

1. Current vehicles—(4)
2. List of active vehicle mission plans—vehicles assigned to an inventory request
3. List of vehicle status
   a. In use
   b. Operational, not in use
   c. Nonoperational
   d. Tracking data (progress against the mission plan derived from the inventory request)

Inventory request server—(5)

4. Accepts an inventory request of the following types
   a. Pick-up pallet at specified pallet location, and
   b. Stow pallet at specified pallet location
   c. May also support other special requests like:
      i. Proceed to refueling station
      ii. Proceed to parking location
      iii. Proceed to workcell for preventative maintenance
      iv. Other
5. For each inventory request:
   a. Select a truck that is "Operational not in use"
   b. Build a mission plan for the Pick-up and Stow operation
   c. Send it to the truck
      i. As a digital mission plan to automated trucks
      ii. As a human readable traveler to manual trucks
   d. Monitor operation
      i. Update automated lifts database (truck becomes "In use")
      ii. If truck failure occurs during the mission, notify operations personnel to diagnose and potentially manually drive failed lift back to maintenance—update automated lifts database (truck becomes "Nonoperational")
         1. Automatically re-issue inventory request so server reassigns new vehicle and issues new mission to accomplish the request
      iii. At pick-up, truck identifies and engages the specified pallet from the lot
         1. System controller relieves Lot and Pallet inventory database of pallet engaged and now in transport
      iv. At delivery, truck verifies delivery location and disengages the pallet for delivery
         1. System controller updates Lot and Pallet inventory database of pallet disengaged and delivered
      v. Upon mission complete, update automated lifts database (truck becomes "Operational not in use")—Manual mission complete is signaled when drive signals traveler is completed (through any manual means in common use).

Inventory server to enterprise ERP (Enterprise Resource Planning system) systems—(6)

1. Interfaces pick-up and delivery requests from the ERP into the Inventory server
2. Interfaces pick-up and delivery status and completed for each request from the Inventory server to the ERP Through an automation kit outlined in FIGS. 8 and 9, we replace the manual operator of a standard lift truck of the type shown in FIG. 3 or any alternative configuration. This unit shows control of forward/reverse speed (21) Ackerman rear wheel steer (22), Forward/reverse tilt to the mast (23), side shift of the forks (24), and raising/lowering of the forks (25). Shown to the right is an additional attachment that supports operations in very narrow aisleways by allowing the forks an additional side shift (26) and rotation (27) so that pallet can be acquired + or −90 degrees offset from the lift truck's normal forward orientation. Additional manipulation degrees of freedom might be available from alternative tuck types.

Figure 3:
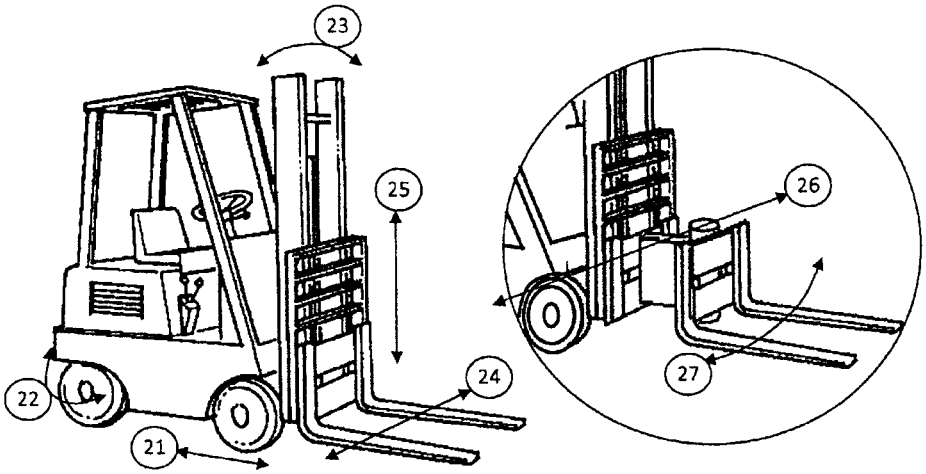
FIG. 3 shows a lift truck automation showing rear wheel Ackerman steering.
Figure 4:
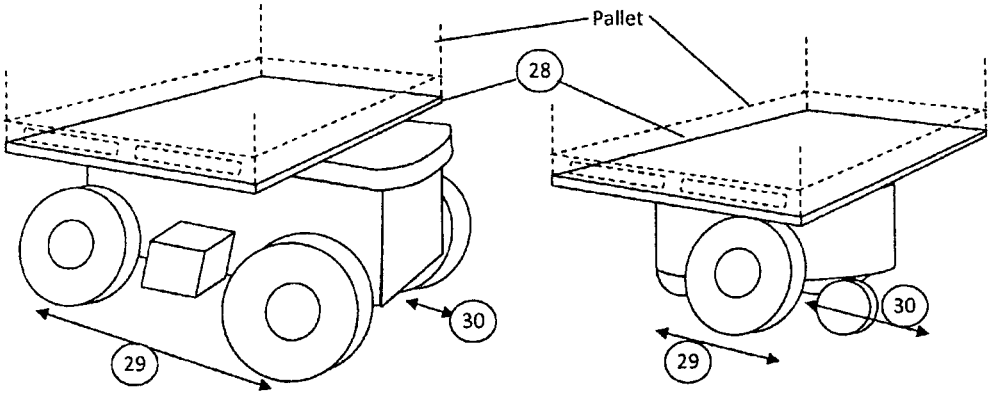
FIG. 4 depicts two platforms with no forks and skid steer.
Figure 5:
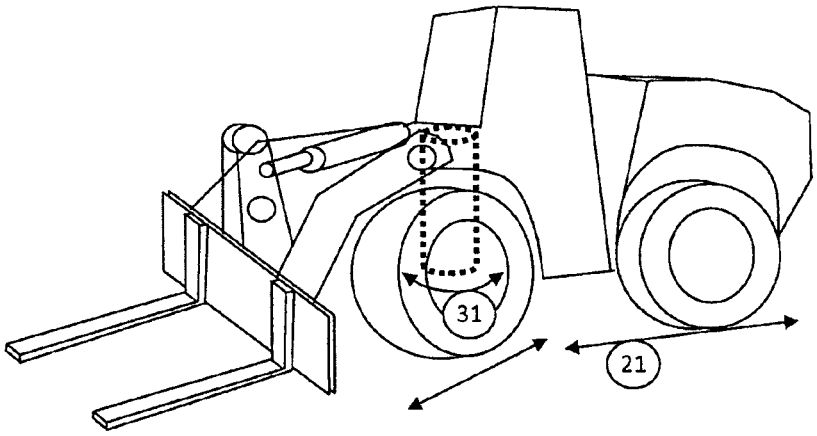
FIG. 5 shows a platform with steer by rotation at the vehicle waist.

For simple pick-up and place applications, where external lift systems load or unload the pallet external to the automated vehicle, the vehicle might provide a pallet attachment point (28) but no forks as shown in FIG. 4. The base mobility platform provides a means of steering (Ackerman as shown in FIGS. 3 (21) and (22); skid (29) and (30) as shown in FIG. 4, at the waist (31) as shown in FIG. 5, or any other alternatives) and apparatus for controlling speed (either through braking or accelerator speed controls or both). The base platform may be powered by electric, internal combustion (gasoline, LP or natural gas, diesel) or any alternative mechanism. Power mode makes very little difference to the invention, except that electric power can be switched on, and must provide apparatus (a parking checkpoint or destination) for electric recharge periodically. Internal combustion powered units benefit from an engine and fuel type specific start-up sequence and periodic refueling processes at the designated refueling checkpoint.

Figure 6:
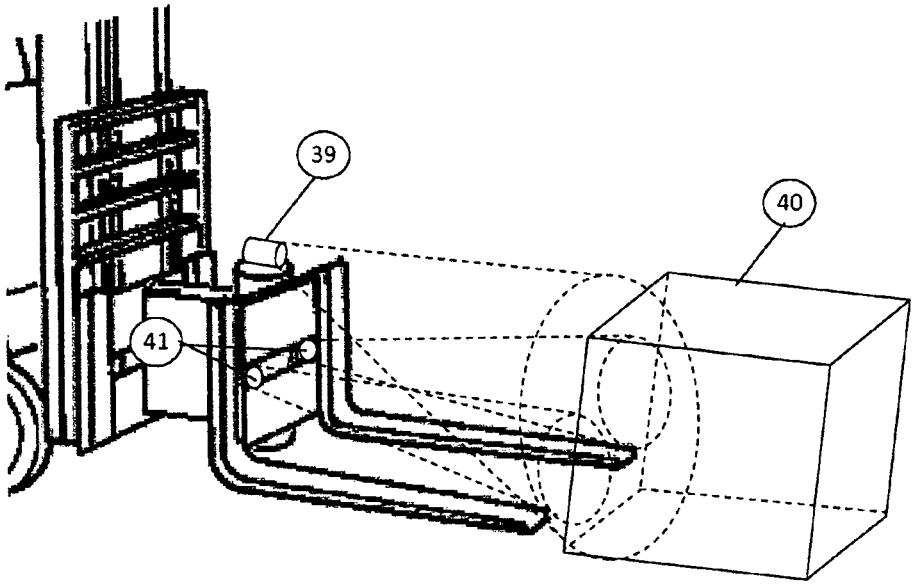
FIG. 6 shows lift truck collision detection sensors.

FIG. 6 depicts a representative sensor suite required to detect people and obstacles in the local area around a lift truck operating in autonomous mode. The sensor suite is tasked with the responsibility for detecting objects not predicted in the maps within a safe stopping distance depending on forward or reverse speed. To accomplish this, laser radar 3D measurement devices sweep the area before and behind the lift. In the back this is done scanning from a height comparable to the head/eyes (32) of a manual operator, sweeping out a wide angle vertical and horizontal solid angle (33). Placing the sensor lower may constitute a potential collision risk from behind and it is possible to get 3 dimensional measurements closer to the tail end of the truck with this geometry.

In the front, two laser sensors are shown in FIG. 6. One is mounted on the mast near the floor (34). This unit can be scanned up and down a small angle by tilting the mast forward and reverse (35). This sensor is primarily tasked with detecting forward driving obstacles, but can also be used to find pallets and pallet stacks. A second sensor is fixed to the fork elevator (36) and sweeps a half cylindrical area (37) as the lift moves up and down the mast. This sensor is tasked primarily for detecting pallet fork openings and the top pallet in a pallet stack, but it too can aid system in sensing obstacles when driving forward. Note that between these two sensors the automated truck has almost 100% unobstructed obstacle visibility. This is far superior to a human driver's visibility because he/she has to sight through the front forks.

On a fork truck of the type shown, extreme steering action also causes the backend of the truck to swing out. Therefore inexpensive collision sensors (38) are added to both sides of the truck in the rear to detect possible collisions due to this swing action. While collectively these range sensors provide better visibility than a human driver would have, their placement and number is both automated lift vehicle dependent and constrained by target automation kit cost. For instance, a truck that works in a "lights-out" area that is restricted to unplanned actors (for instance, manually drive trucks and pedestrians) could operate strictly with the one range sensor mounted on the fork elevators to find pallet stack tops and pallet lift holes only. Devices with different mobility, visibility, and lifting capabilities would certainly mount these sensors in different places. The configuration described in the preferred embodiment supports trucks of the type shown and in an environmental where the intention is to mixing human and automated performers.

Figure 7:
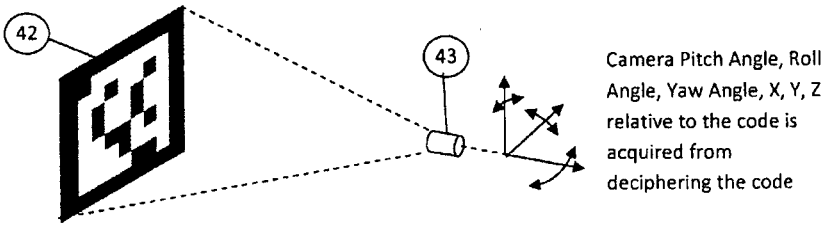
FIG. 7 illustrates lift truck pallet/lot identification sensors.

FIG. 7 shows placement of several video based sensors used to find and read a pallet identifier. The top camera (39) images the entire side of the pallet (40) and uses image processing to identify the gross placement of the bar code, UID, Character notations (OCR) or other identification markers. Then the two smaller field cameras (41) are used to hone in and read the code identifier at sufficient resolution to achieve reliable code deciphering. Alternatively, or in addition, these sensors could include a short range RFID reader or any alternative pallet identification method. An advantage of using cameras is that they can also be used to place roadway or path segment signage up in the warehouse.

FIG. 7 shows a two dimensional barcode type (42) that is in the public domain [Artool Kit, 2012] that can code both content data (the internal bit pattern codes the content) and location of the lift truck relative to the sign placement location. For this code a camera (43) and simple image processing algorithm finds the black square frame, and especially the location of its corners. It then reads the internal bit pattern adjusted for perspective skew. If the deciphered code is "correct", i.e. can be validated as having been assigned to a known location, its location when added to the offset from the code to the lift truck provides the truck automation controller an exact fix within the warehouse area. These codes could also be placed on the floor as easily as anywhere other known location in the warehouse. Additional details are provided in the truck localization discussion.

Figure 8:
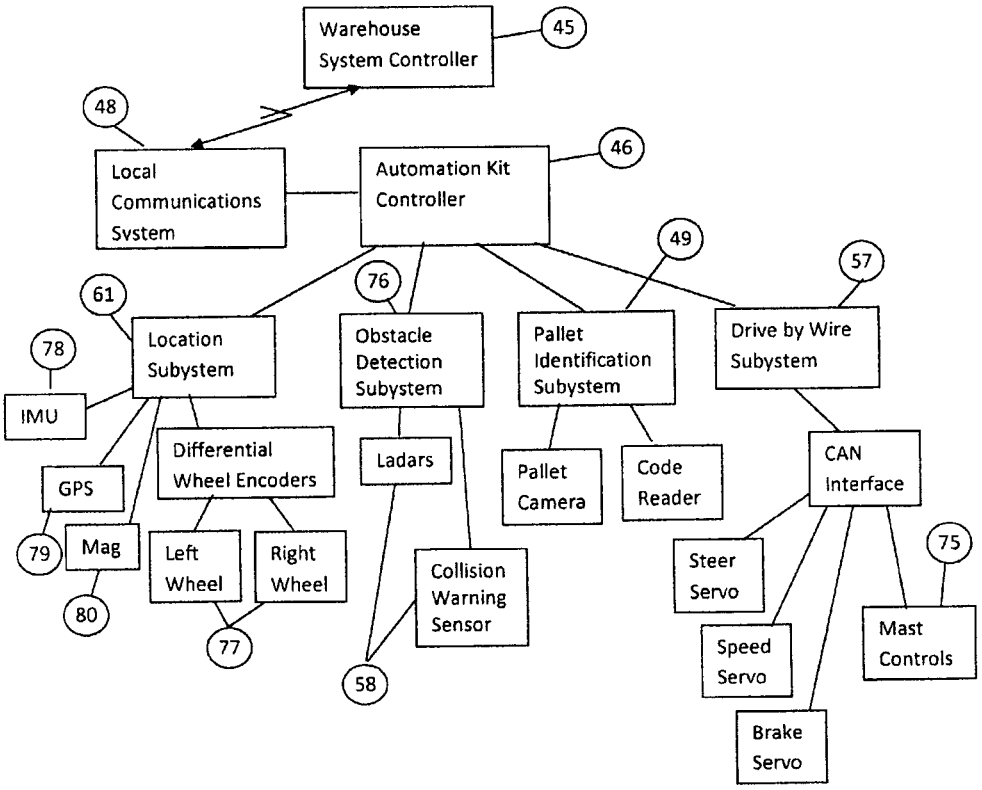
FIG. 8 shows automated lift control hardware architecture.
Figure 9:
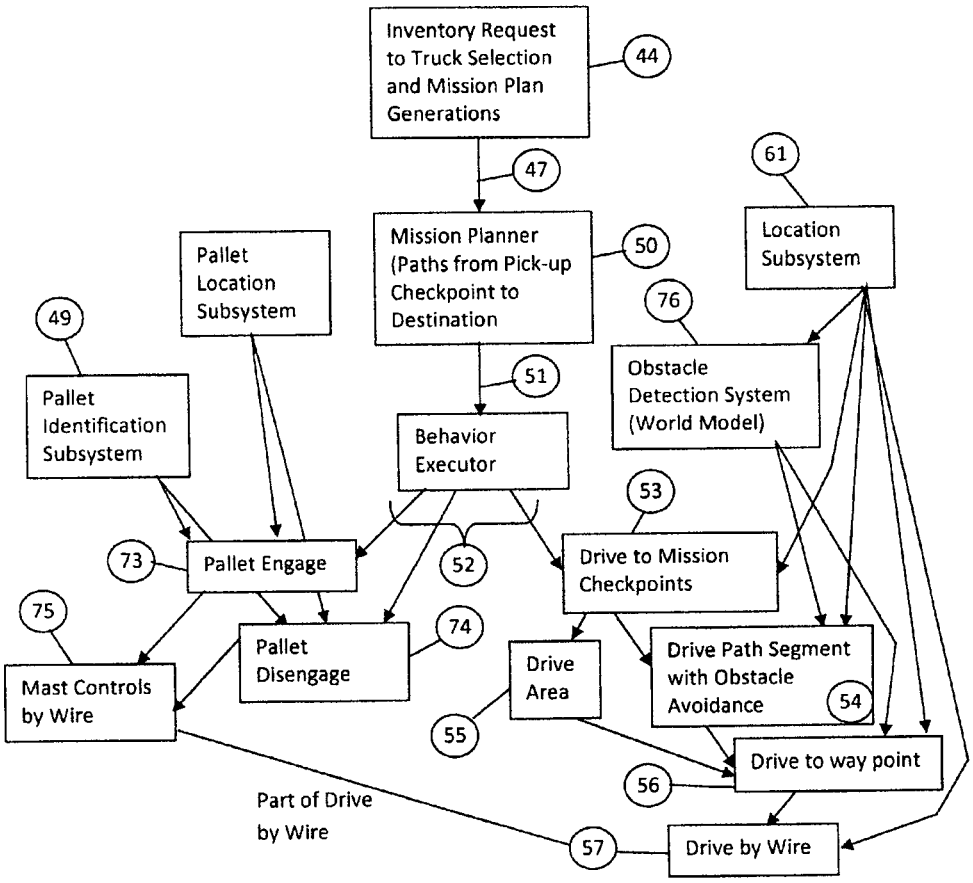
FIG. 9 shows an automated lift control software architecture.

FIG. 8 shows the automation control kit hardware architecture applied to automate lift trucks or transporter vehicles. The current preferred embodiment is adapted to larger rugged terrain lifts, warehouse forklifts, two alternative pure pallet transporter vehicle platforms, and is adaptable to automobiles and trucks in general. This kit supports virtually any type of skid steer or Ackerman drivable vehicle or mobile platform with an attached lift, adaptable to a pallet carrier, or alternative payload. FIG. 9 shows the logical control software system modules and data flow that [operate] *operates* within the hardware architecture.

The warehouse(s) system (45) controller receives inventory store or retrieve requests (44) from a loading dock operator, an enterprise ERP, a worker as a depalletizing stations, or enterprise-specific alternatives. The system controller (45) looks up availability to support the request (either availability of an empty storage slot for storing pallets or availability of inventory for in-stock items), and its source and destination locations (for instance for a store the source is a loading dock parking space and the destination is the storage slot assigned to the pallet) in the Lot and Pallet Inventory Database (1). It then assigns an unassigned lift truck to this operation, updating its status in the Lifts Database (3).

The assigned truck Automation Controller (46) receives the mission plan (47) over the local communications link (48), which is to move from the current location to the source location, find, identify, and engage the pallet (or in the case of a truck without a lift, wait for the pallet to be loaded onto the truck), and then proceed to the destination location. When the destination is reached, the mission continues with identification (49) of the storage slot including identifying the lot, finding the shelf location of the pallet stack, finding the top of the pallet stack, and disengaging the pallet at that location (in the case of a truck without lifts, a simpler logic, which is to wait to be unloaded is substituted).

At that point the mission is complete, and the truck signals complete to the warehouse controller, which, in turn, updates to Lot and Pallet Inventory Database (1) to log the location of the pallet, and updates the automated vehicle status in the Lifts Database (3) putting that truck back into the freed or unassigned pool. The same operation can be assigned to manually controlled lift operators through man-readable travelers. Manual operators perform essentially the same operation over the same storage space, and then notify the warehouse controller of mission complete and can also then be reassigned to a new operation.

To accomplish the mission the truck operates a Mission (route) planner (50) over the Maps Database (2) that selects the preferred route from the current position to the source or pick-up location and later from the pick-up position to destination or the drop-off position (in an alternative embodiment, this planning might alternatively be done by the warehouse system controller as part of its mission plan sent to the assigned truck). This drive route plan (51) is a connected graph of free drive points from locations within areas to area exit checkpoints, to path segments on roadways, to final pallet stack locations, and may include attached behaviors that are invoked based on current point of execution in the plan. The assigned lift for the mission (which is the drive mute plan (51)) is the one closet to the source location and unassigned. The driving plan is generally selected to minimize drive distance from current location to source to destination. The execute hierarchy is to decompose the plan into a series of behaviors (52), some of which drive to checkpoints (53). The drive from checkpoint to checkpoint breaks down into traversal of Path segments (54) or Area sections (55). Since the drive plan is a list of segments or areas, which are defined as a string or list of waypoints (8)(12), the truck drive to way point function (56) generates intermediate points between the waypoints automatically through a smooth curve fitting algorithm to fill in gaps in the waypoint data. The drive-by-wire (57) control maintains commanded speeds, steer angle controls, and direction of travel to hit these intermediate points, and at the end of certain segments, rotates the truck orientation to match the end waypoint orientation that has been commanded.

The driving plan contains data for each area and segment specifying the maximum speed limit. The lift might actually traverse the segments more slowly than this based on assessment of load stability and other factors like turning, approach to a four way stop intersection, etc. Traffic controls like 4-way stops, traffic merge intersections, speed limits, or other safe operations related items are coded into the Maps Database and consulted by the automated drive system along the route in real-time to change appropriate driving behaviors.

Figure 10:
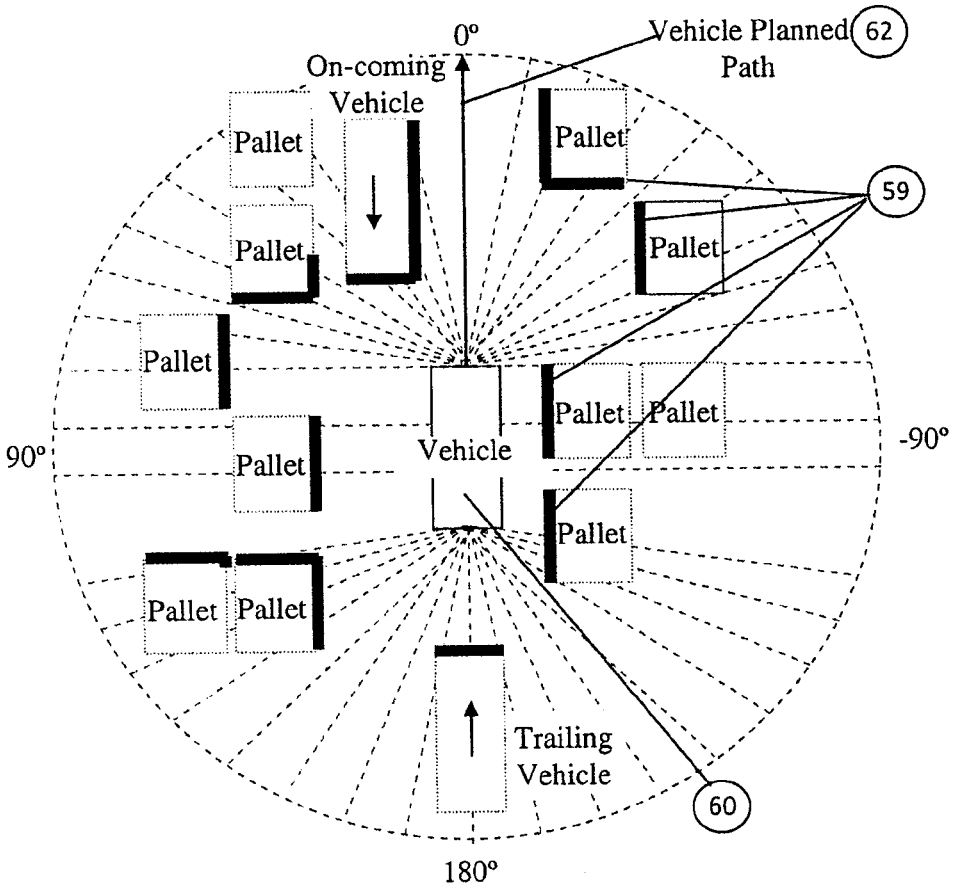
FIG. 10 shows potential obstacles (darker thick lines) as range measurements plotted to a truck centered polar coordinate space.

Because the Maps Database (2) and the Lots and Pallets Inventory Database (1) contain only "static" data on where safe driveways and pallet stacks are located, the lift also continuously consults its internally acquired measurement of the range to potential obstacles. All data from the Object Detection sensors (58) and in FIG. 5 produce range points in the three dimensional space around the automated lift truck. Referring to FIG. 10, these points are surfaces of objects (59) around the truck and can be projected down on to the polar coordinate space centered on the truck (60). Through coordinate transforms, these obstacles can also be readily translated into the world coordinate space around the truck through the truck's own location and orientation in that space as maintained by the Location System (61). These projections to the truck polar are obstacles if they would interfere with the truck's planned path (62).

FIG. 10 shows potential obstacles as the darker thick lines (59) as seen in range measurements plotted to a truck centered polar coordinate space—the space is conceptually polar, but can be coded in alternative implementations as a truck centered Cartesian space and can be translated and rotated to correspond with the world coordinate Cartesian space in which the truck moves. This representation is the truck's local "World Model."

Figure 11:
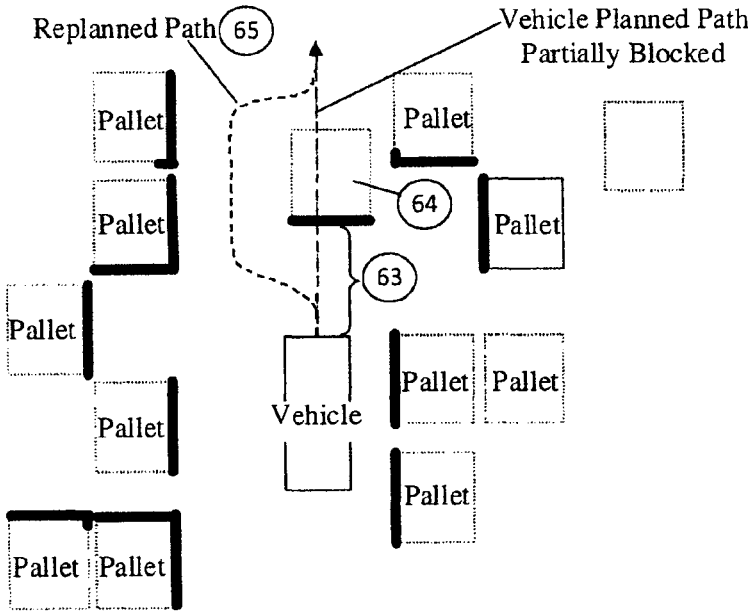
FIG. 11 shows replanning due to partial aisle blocked.

As shown in FIG. 11, as the truck drives the shortest planned path, it also looks up the distance along this path (63) to the nearest obstacle (64). It determines if this is an obstacle by whether it is necessary to slow down from the current speed (to stop in the near future), stop, or steer around the obstacle. This is called out as Obstacle Detection (76) in FIG. 8. If [a] *an* obstacle collision in imminent, the truck replans to a path around obstacle detected within limits (65). These limits set to how far left or right of the planned path segment drive path the truck has authority to deviate to drive around an obstacle or avoid an obstacle without also hitting something else. So for example, the truck cannot hit pallet stacks to the left or right to avoid an obstacle that is its drive path and it can only deviate from plan up to a predetermined amount. The limits set in area driving are that the truck must stay within the area boundaries. If the obstacle can be steered around within these limits, the truck does that. This is Drive Path Segment with Obstacle Avoidance (56).

If the truck is approaching an intersection, or other segment that is identified to require cueing, rather than obstacle avoidance or passing, the truck simply waits its turn to go behind other vehicles. If it is cued up behind a slower moving vehicle, it adjusts its own speed accordingly (in some implementations, there might be a passing behavior for slow moving vehicles if not near an intersection, but in a warehouse where lane space is constrained, this behavior would not normally be applied).

Figure 12:
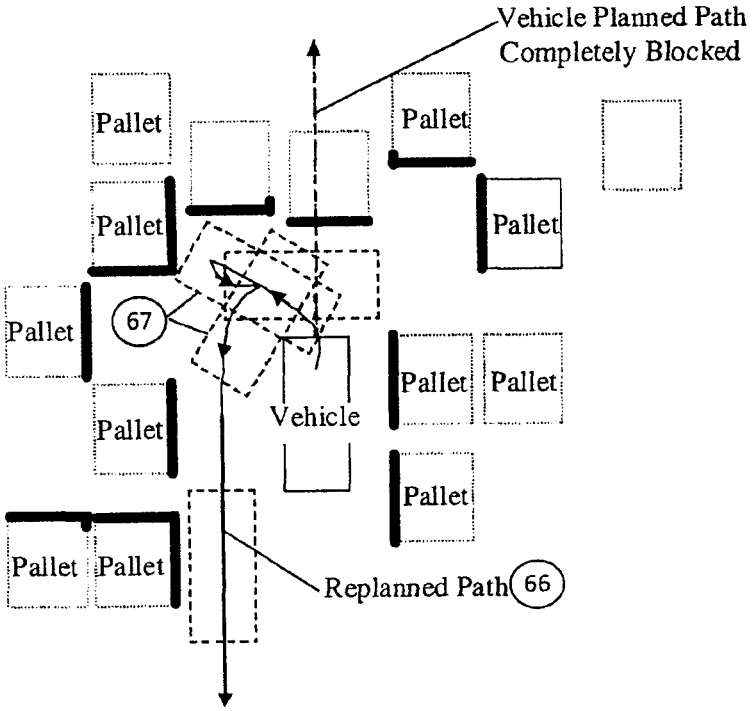
FIG. 12 illustrates replanning due to complete aisle blockage.

As shown in FIG. 12, if the selected route is irreparably blocked, the lift signals this condition to the system controller, which would generally update the Maps Database and notify supervisory operations, and the lift stops and replans an alternative path (66) after its map data has been updated to reflect the blockage. Sometimes a truck has to back up to the last intersection point or perform a turn around behavior (67) to head back along a parallel path segment in the opposite direction.

Figure 13:
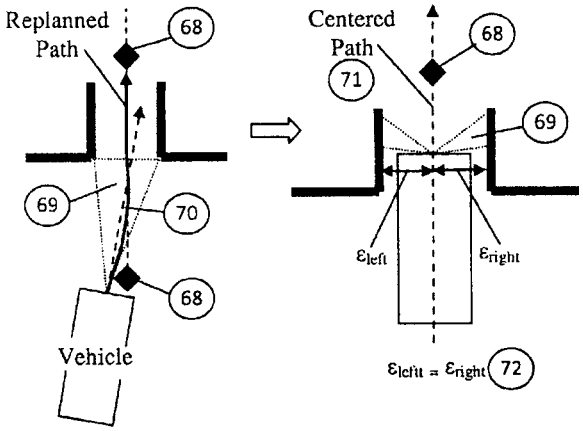
FIG. 13 shows narrow spaces maneuvering.

Others special uses of the range data fusion include moving through very narrow spaces or doorways shown in FIG. 13. These tight spots are marked as properties of checkpoints indicating entering and leaving the tight segment (68). The specific behavior approaching these segments is to use range data (69) to determine the size, location and orientation of the tight throughway. This data updates the planned path (70) for the approach and when the truck actually enters the throughway, its drive behavior reverts to side-wall or door jamb range-based steer control (71) so as to directly maintain even spacing on both sides of the lift an its centered load (72).

Pallet engagement (73) and disengagement (74) also uses the range data sets, but in an engagement task specific manner. Pallet engagement is performed in three steps. First the lift truck approaches the approximate position of the pallet stack provided to it as the source or destination location (with orientation) defined by the system controller and provided to the truck in the mission definition. In the second step the truck stops and evaluates its local obstacle map (FIG. 10) for the nearest pallet stack at or beyond its stop position, which it then aligns to. In the third step, the truck uses its Mast-Controls-by-wire (75) and sensors (58) to:

1. Scan and capture the pallet stack from bottom to top (or to a predefined maximum height)
2. Determine the precision position of the pallet stack face
3. Move the forks to the correct position for stack approachment (for picking a pallet this is alignment with the fork holes of the topmost pallet; for placing a pallet this is alignment to the space just above the topmost pallet)
4. If a pick operation, it optionally uses the wide area camera (39) to find the pallet identification barcode and one of the narrow angle cameras (41) to identify the pallet by reading its pallet identifier. If placing a pallet, lot identification is done on any pallet that is down from the topmost pallet in the stack. Alternative means of identification can be use with or instead of these methods, including RFID, etc.
5. Upon pallet or lot identification, the lift moves forward to align the payload pallet to the stack (or to insert the forks into the topmost pallet holes)
6. To engage, the lift truck lifts the topmost pallet up and pulls back away from the stack; to disengage, it lowers the forks until the pallet rests on the top of the stack and then the lift slightly lifts up and pulls back away from the stack.
7. It then lowers it forks to the predete mined safe travel level above the floor, plans its next movement, and executes the plan, to take the lift and its payload to the next destination (or back to the source location).

The lift plans and then drives paths from the source location to the destination location, traversing along a series of path segments and through areas so as to visit each specified checkpoint (and perform any behaviors enabled or attached to these checkpoints). The process requires at its most primitive drive by wire level (57) that the lift know its position in "World Coordinates" or the coordinates of the Maps Database (2). The drive by wire system (57) adjusts steer angle and speed so that the lift approximately traces the predetermined path by minimizing location error between the truck and the generated smooth curve between each pair of waypoints that define the path and at certain checkpoints or way points, also rotates the lift into the specified orientation.

The location subsystem (61) maintains the truck location in the World Coordinates by referencing and fusing all data that contributes to measuring the truck location. The truck has optical wheel encoders (77) or an alternative rotational motion measurement sensor on each side so that distance traveled can be estimated by averaging the distance traveled on each side. Turning can also be estimated from this data using differential odometry applied to well known Ackerman [King-thele 1818] or Skid Steer [Lavrovsky 1877] formulas. Because turn angle estimation by differential odometry is inaccurate, we incorporate several alternative means of orientation change measurement. One is the yaw rate measured from an angular inertial measurement unit or IMU (78). These units provide measures of heading change and tilt. When heading change and tilt (roll and pitch) are summed and filter this can provide a short term accurate estimate of vehicle heading angle and its pitch/roll angle on an incline.

Many IMUs include three accelerometers to determine forward/reverse acceleration, side to side acceleration and down acceleration, which also measures the force of gravity down. Summing measurement from these units after subtraction of the gravity vector allows estimation of vehicle velocity as a three vector from a known starting velocity (typically from zero or standing still). Summing again allows estimation of the vehicle's change in position from a known starting point. Thus the inertial measurement unit independently contributes an orientation and position estimate which can be fused with the differential odometry estimates to improve heading estimation performance.

The problem with both IMU and differential odometry is holding accuracy over time. Estimate drift occurs because neither of these approaches capture heading and position changes precisely enough against an absolute reference. They provide highly accurate estimates of the recent past, but over a long track accuracy is lost based on accumulated estimate errors. Thus any long term location subsystem has to augment theses relative measurement systems with overwatch absolute measurements.

The two main absolute measurement methods are to make measurements of position relative to objects in the environment (the warehouse) that are at known locations and stationary or measurements to external beacons at known locations. An example of the fowler is measuring position relative to an unambiguous feature in the warehouse, like a door opening (FIG. 13), a corner, or a placed location sign (or code as shown in FIG. 7). Use of placed codes on walls or floors has been done before for robotic or automated guided vehicle applications. An example of beacons commonly used for outdoor vehicle driving is GPS (79). GPS units can be had that provide accurate ground tracks to better than 20 cm accuracy. Orientation only bounding can be had from magnetic compass or magnetometer sensor (80) with filtering to eliminate false reading due to proximal uncalibrated ferromagnetic objects.

Figure 14:
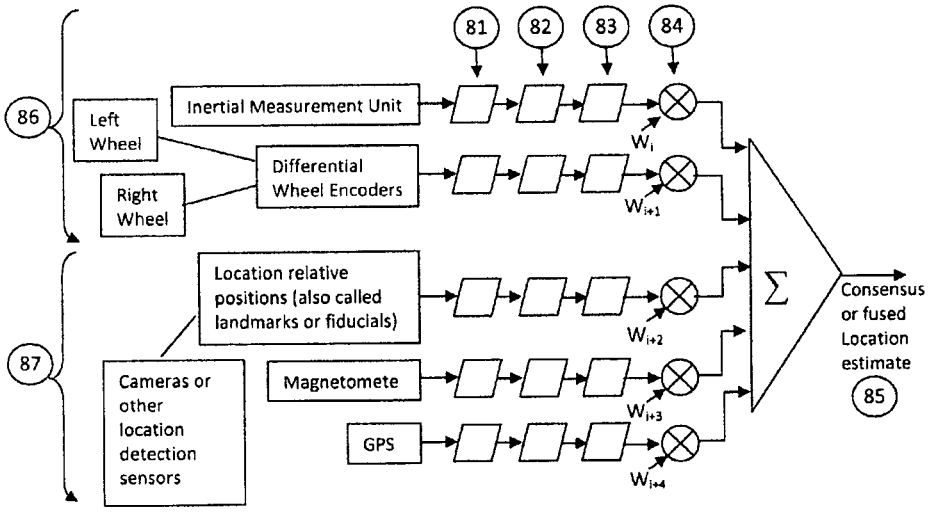
FIG. 14 shows a location sensor fusion.

Absolute measurements can provide both orientation and position overwatch to bound the more locally accurate, but drift prone relative measurement systems. Generally fusion of absolute and relative measurement devices takes the form shown in FIG. 14. Each estimate is scaled (81) to common dimensions (for instance, radians and meters), filtered (82) & smoothed (83) independently in a sensor specific manner and summed through a weighted (84) averaging equation set (85). Counter intuitively, usually the relative sensors (86) are weighted more heavily than the absolute sensors (87). The relative sensors provide locally smooth estimates and absolute sensors are only required to provide small error corrections to bound relative sensors' drift errors. Too large a weighting of absolute sensors can cause unsmooth random jumps within the absolute sensor's circular error probability (CEP) radius. Thus a fractional (<1.0) weighting for absolute sensors reduces this unsmooth jumping in the composite fused location estimates, but also provides absolute feedback to compensate for relative sensor drift processes.

Our approach to location estimation through fusion also allows flexible addition and removal of specific sensors depending on the operating mission requirements. For instance, GPS might be used for trucks that travel outside between warehouses, but might be completely removed for trucks that only work in warehouses. In some applications of the technology, going in and out through a specific doorway (FIG. 13) provides all the absolute location determination necessary to keep relative orientation and position sensors bounded. In alternative implementations other estimators, like Kalman filtering (Larson et al. [1998]), might be used to fuse multiple location and orientation sensors.

In summary, key systems in the automated lift include:

1. self-location system;
2. obstacle detection sensors;
3. pallet identification sensors; and
4. drive by wire-controls with behaviors including obstacle avoidance.

The key inventory management system controller functions are:

5. ERP interface;
6. inventory request processor;
7. mission planner (to accomplish the inventory requests); and
8. execution (and lift truck) monitoring systems.

Item (7) and (8) are allocated to the system controller or each lift under its command depending on the particular implementation.

The invention claimed is:

1. A system for automated inventory management and material handling, comprising:

one or more automatically-driven robotic material handling vehicles, each including:

a) drive-by-wire [operation] *apparatus* with automated and manual controls[,]*;* b) a location determining subsystem[,] *including:*

*a relative position measurement device operative to generate a signal representitive of relative vehicle position,*

*an absolute position measurement device operative to generate a signal representitive of absolute vehicle position, and*

*a processor for receiving the signals from the measurement devices, the processor being further operative to perform an averaging function on the signals to generate a estimate of vehicle location based upon relative and absolute vehicle position;* c) a proximity obstacle detection and avoidance subsystem[,]*;* and d) a subsystem to support automatic traversal from a pick-up location to one or more drop-off locations[, and an inventory systems controller, including:

a) database of inventory stored in a storage facility, b) a maps database associated with the layout of the storage facility, c) a database of the automatically-driven robotic material handling vehicles, and d) an inventory request server that accepts inventory requests, selects an available vehicle, and sends the vehicle on a mission plan using the maps database to carry out the inventory request].

2. The system of claim 1, including *a robotic material handling vehicle operative to receive* inventory requests to place palletized material into storage at a specified lot location, or retrieve palletized material from a specified lot location.

3. The system of claim [1] *14*, wherein the database of stored inventory associates lot and pallet identification with pallet location.

4. The system of claim [1] *14*, wherein the maps database includes waypoints, checkpoints, path segments, and area sections.

5. The system of claim [1] *14*, wherein the vehicles database includes vehicle mission plans, tracking data, and vehicle status.

6. The system of claim 1, including automatically-driven robotic material handling [vehicles] *vehicle* with sensors and processing electronics enabling the vehicle to navigate through narrow doors or passages and security checkpoints.

7. The system of claim 1, including *an* automatically-driven robotic material handling [vehicles] *vehicle* with modular, mission-specific sensors within a common location determination architecture.

[8. The system of claim 1, wherein one or more of the following sensor technologies are fused into a common location determination architecture:

GPS,
IMU,
magnetometer,
differential odometry,
RFID fiducials, and
visual fiducials.]

[9. The system of claim 1, including automatically-driven robotic material handling vehicles with sensors to read and interpret visual codes that encode location and other associated data as fiducials to determine indoor locations.]

10. The system of claim 1, [including automatically-driven robotic material handling vehicles with sensors] *wherein the location determining subsystem includes a sensor* to read and interpret [RFIDs] *a computer-recognizable code or fiducial* that [encode] *encodes* location [and other associated data as fiducials or pallet identifiers to determine identification and to determine locations].

11. The system of claim 1, including *an* automatically-driven robotic material handling [vehicles] *vehicle* in the form of *an* autonomous fork [trucks] *truck.*

12. The system of claim 1, including *an* automatically-driven robotic material handling [vehicles] *vehicle* in the form of *an* autonomous mobile [platforms] *platform.*

13. The system of claim 1, further including [manually driven fork trucks or other material handling equipment] *an automatically-driven robotic material handling vehicle* in communication with [the] *an* inventory systems controller to receive mission plans to carry out the inventory request.

*14. The system of claim 1, further comprising:*

*an inventory systems controller, including:*

*a) database of inventory stored in a storage facility;*

*b) a maps database associated with the layout of the storage facility;*

*c) a database of the automatically-driven robotic material handling vehicles; and*

*d) an inventory request server that accepts inventory requests, selects an available vehicle, and sends the vehicle on a mission plan using the maps database to carry out the inventory request.*

*15. The system of claim 10, wherein the computer-recognizable code is an RFID tag or barcode.*

*16. The system of claim 1, wherein the relative position measurement device is an inertial measurement unit.*

*17. The system of claim 1, wherein the relative position measurement device is differential wheel encoder.*

*18. The system of claim 1, wherein the absolute position measurement device is a sensor operative to detect a fixed landmark or fiducial.*

*19. The system of claim 1, wherein the absolute position measurement device includes a global positioning satellite (GPS) receiver.*

*20. The system of claim 1, wherein the absolute position measurement device is a magnetometer.*

* * * * *